US012701041B2

(12) United States Patent
Yaron et al.

(10) Patent No.: US 12,701,041 B2
(45) Date of Patent: Aug. 4, 2026

(54) TECHNIQUES FOR NETWORKING ADDRESS PATH RESOLUTION USING CORRELATION

(71) Applicant: Dazz, Inc., Palo Alto, CA (US)

(72) Inventors: Eshel Yaron, Amsterdam (NL); Rom Gendler, Tel Aviv (IL); Dor Zusman Cohen, Tel Aviv (IL)

(73) Assignee: Wiz, Inc., New York, NY (US)

( * ) Notice: Subject to any disclaimer, the term of this patent is extended or adjusted under 35 U.S.C. 154(b) by 223 days.

(21) Appl. No.: 18/763,149

(22) Filed: Jul. 3, 2024

(65) Prior Publication Data

US 2025/0080397 A1     Mar. 6, 2025

Related U.S. Application Data

(60) Provisional application No. 63/579,559, filed on Aug. 30, 2023.

(51) Int. Cl.
| | |
|---|---|
| *H04L 41/0631* | (2022.01) |
| *H04L 41/0604* | (2022.01) |
| *H04L 43/045* | (2022.01) |

(52) U.S. Cl.
CPC ...... *H04L 41/0631* (2013.01); *H04L 41/0627* (2013.01); *H04L 43/045* (2013.01)

(58) Field of Classification Search
CPC   H04L 41/0631; H04L 41/0627; H04L 43/045
USPC ........................................................ 709/224
See application file for complete search history.

(56) References Cited

U.S. PATENT DOCUMENTS

| | | | |
|---|---|---|---|
| 9,842,209 | B2 | 12/2017 | Tamir et al. |
| 10,515,366 | B1 | 12/2019 | Gorelik et al. |
| 10,560,309 | B1 * | 2/2020 | Chitalia ............... H04L 41/0631 |
| 10,645,022 | B2 * | 5/2020 | Kaminski ........... H04L 43/0817 |
| 10,809,936 | B1 | 10/2020 | Kaushik et al. |
| 11,003,766 | B2 | 5/2021 | Kraus et al. |
| 11,397,808 | B1 * | 7/2022 | Prabhu .................. G06F 21/566 |
| 11,582,257 | B2 * | 2/2023 | Shua .................... G06F 9/45558 |
| 2017/0132296 | A1 * | 5/2017 | Ding ...................... G06F 16/248 |
| 2017/0171235 | A1 | 6/2017 | Mulchandani et al. |
| 2018/0302306 | A1 * | 10/2018 | Carroll .................. H04L 43/026 |
| 2020/0042700 | A1 | 2/2020 | Li et al. |
| 2021/0373924 | A1 * | 12/2021 | Sivaraman .............. G06F 9/505 |
| 2022/0294686 | A1 | 9/2022 | Triplet et al. |
| 2024/0406147 | A1 | 12/2024 | Ossipov et al. |

FOREIGN PATENT DOCUMENTS

| | | |
|---|---|---|
| EP | 3550453 A1 | 10/2019 |

\* cited by examiner

*Primary Examiner* — Karen C Tang
(74) *Attorney, Agent, or Firm* — M&B IP Analysts, LLC

(57) ABSTRACT

A system and method for mitigating alerts using network path resolution. A method includes generating a graph mapping between computing resources and workloads, wherein the graph includes nodes and edges, wherein the nodes include computing resource nodes representing respective computing resources and workload nodes representing respective workloads, wherein each workload is at least one process; identifying a path including at least one first workload of the workloads by querying the graph based on a first computing resource of the computing resources indicated in an alert; identifying at least one root cause of an alert based on the identified path; and performing at least one mitigation action based on the identified at least one root cause.

15 Claims, 5 Drawing Sheets

300

Start

S310

Analyze computing resource data for connections

S320

Identify resolution routes

S330

Create paths

S340

Rank paths

S350

Generate heatmap

End

TECHNIQUES FOR NETWORKING ADDRESS PATH RESOLUTION USING CORRELATION

CROSS-REFERENCE TO RELATED APPLICATIONS

This application claims the benefit of U.S. Provisional Patent Application No. 63/579,559 filed on Aug. 30, 2023, the contents of which are hereby incorporated by reference.

TECHNICAL FIELD

The present disclosure relates generally to securing computing infrastructures, and more specifically to identifying root causes by resolving network address paths.

BACKGROUND

Many companies provide tools for monitoring behavior in computing infrastructures which may be used to help identify and mitigate potential cyber threats. These alerts often provide some general information about where abnormal or otherwise potentially malicious behavior has been identified within the infrastructure. However, simply knowing where the alert was triggered is typically insufficient to actually solving the issue.

To help with this challenge, some existing solutions provide additional information which may help in identifying the root cause such as an Internet Protocol (IP) address. However, this information is usually provided only at a high level and cannot be used to identify the exact source of the issue. As a result, time and resources may be wasted trying to identify the source of cyber threats within the infrastructure, and the harm caused by actual cyber threats may be exacerbated due to failure to identify and mitigate the threat efficiently.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for mitigating alerts using network path resolution. The method comprises: generating a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of a plurality of computing resources and a plurality of workload nodes representing respective workloads of the plurality of workloads, wherein each workload is at least one process; identifying a path including at least one first workload of the plurality of workloads by querying the graph based on a first computing resource of the plurality of computing resources indicated in an alert; identifying at least one root cause of an alert based on the identified path; and performing at least one mitigation action based on the identified at least one root cause.

Certain embodiments disclosed herein also include a non-transitory computer readable medium having stored thereon causing a processing circuitry to execute a process, the process comprising: generating a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of a plurality of computing resources and a plurality of workload nodes representing respective workloads of the plurality of workloads, wherein each workload is at least one process; identifying a path including at least one first workload of the plurality of workloads by querying the graph based on a first computing resource of the plurality of computing resources indicated in an alert; identifying at least one root cause of an alert based on the identified path; and performing at least one mitigation action based on the identified at least one root cause.

Certain embodiments disclosed herein also include a system for mitigating alerts using network path resolution. The system comprises: a processing circuitry; and a memory, the memory containing instructions that, when executed by the processing circuitry, configure the system to: generate a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of a plurality of computing resources and a plurality of workload nodes representing respective workloads of the plurality of workloads, wherein each workload is at least one process; identify a path including at least one first workload of the plurality of workloads by querying the graph based on a first computing resource of the plurality of computing resources indicated in an alert; identify at least one root cause of an alert based on the identified path; and perform at least one mitigation action based on the identified at least one root cause.

Certain embodiments disclosed herein include the method, non-transitory computer readable medium, or system noted above, wherein identifying the path includes traversing the graph beginning with a node of the plurality of computing resource nodes corresponding to the first computing resource indicated in the alert.

Certain embodiments disclosed herein include the method, non-transitory computer readable medium, or system noted above, wherein the path is a first path, wherein the graph is a heatmap including a plurality of heat values, each heat value corresponding to a frequency of a respective path of a plurality of paths, wherein the first path is identified based further on the plurality of heat values.

Certain embodiments disclosed herein include the method, non-transitory computer readable medium, or system noted above, wherein the frequency of each path is determined based on a number of instances in which the path resolved to a respective workload of the plurality of workloads.

Certain embodiments disclosed herein include the method, non-transitory computer readable medium, or system noted above, wherein the identified path further includes a second computing resource of the plurality of computing resources, wherein the at least one root cause is identified based further on the second computing resource.

Certain embodiments disclosed herein include the method, non-transitory computer readable medium, or system noted above, wherein the identified path is determined based on a resolution of the first computing resource to the first workload, wherein the second computing resource is connected to the first workload Certain embodiments disclosed herein include the method, non-transitory computer readable medium, or system noted above, wherein the first computing resource is an external facing resource which is accessible to at least one external resource deployed outside of a computing environment, wherein the second computing resource is an internal resource deployed inside of the computing environment.

Certain embodiments disclosed herein include the method, non-transitory computer readable medium, or system noted above, further including or being configured to perform the following steps: ranking the plurality of paths based on a frequency of each path, wherein the plurality of heat values is determined based on the ranking.

Certain embodiments disclosed herein include the method, non-transitory computer readable medium, or system noted above, further including or being configured to perform the following steps: identifying a plurality of resolution routes, wherein each resolution route ends with a respective workload of the plurality of workloads; and identifying the plurality of paths based on the plurality of resolution routes, wherein each path includes a subset of the plurality of nodes and a subset of the plurality of edges, wherein the graph further indicates the identified plurality of paths.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
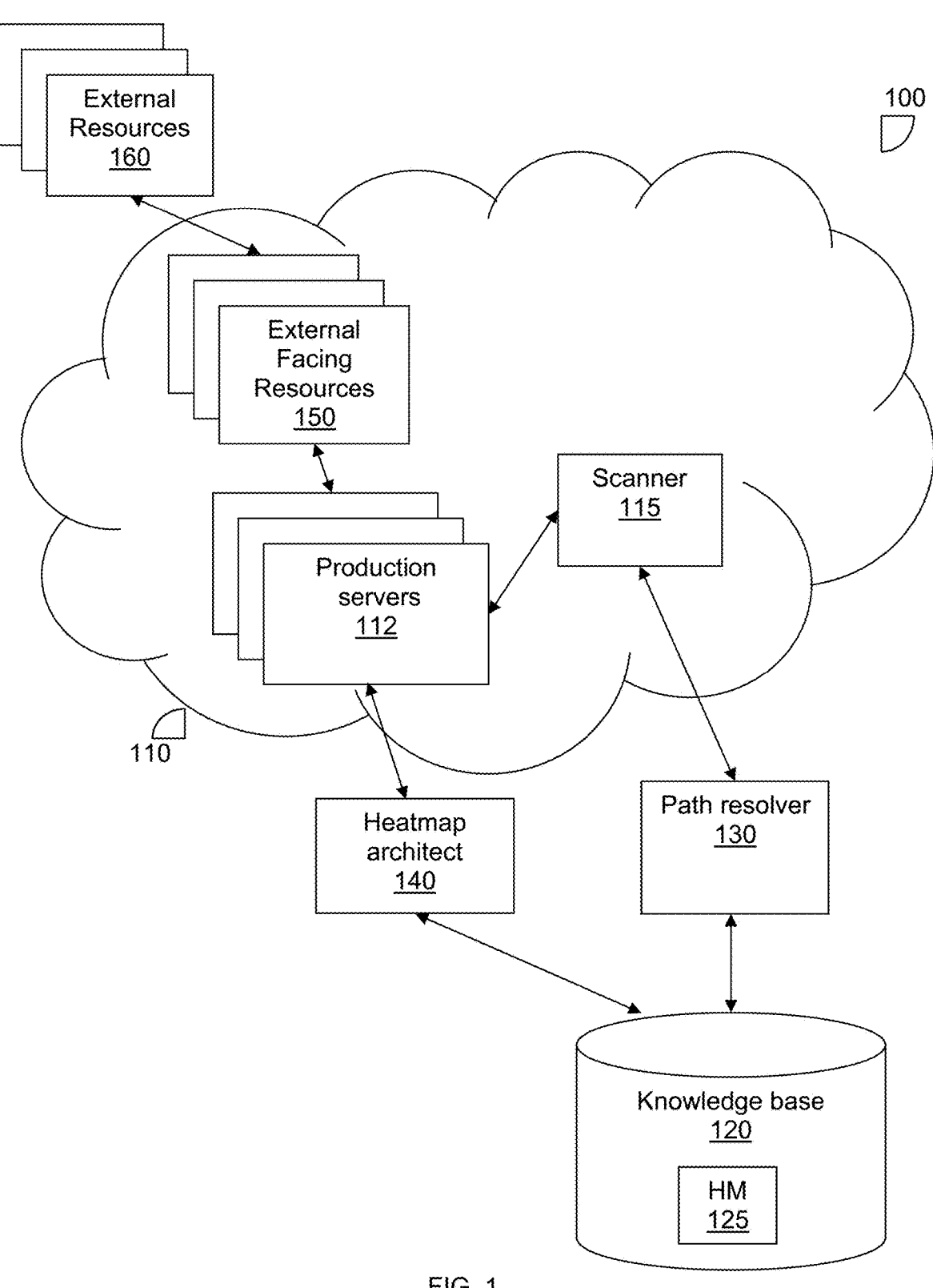
FIG. 1 is a network diagram utilized to describe various disclosed embodiments.

In light of the challenges noted above, it has been identified that information such as Internet Protocol (IP) addresses which may be indicated in alerts generated by cybersecurity tools are not sufficiently granular to accurately identify root causes, and that cybersecurity of computing infrastructures can be greatly improved by more granularly identifying root causes of alerts. More specifically, the specific path between a component involved in alerted behavior and the root cause is useful for finding the exact root cause and determining appropriate mitigation actions. It has further been identified that general information like IP addresses do not usually correspond to a specific component (e.g., a server), and so information like IP addresses cannot be used to find the specific path involved.

The disclosed embodiments overcome this challenge by providing techniques for network path resolution using correlation that allow for more granularly identifying root causes of alerts. The disclosed embodiments further include techniques which leverage the improved identification of root causes in order to mitigate potential cyber threats. More specifically, various disclosed embodiments utilize network path resolution based on correlations between workloads and components in order to unearth paths between internal resources deployed in a computing infrastructure and external facing resources, which are accessible to external resources deployed outside of the computing infrastructure or otherwise expose internal resources to those external resources, which would otherwise be unknown unless explicitly provided.

The various disclosed embodiments include techniques and systems for network path resolution using correlation. In an embodiment, paths of resolution along routes beginning with an address indicated in an alert are mapped based on frequency defined with respect to a number of network addresses that were resolved to workloads through a given path. More specifically, the mapping is defined at least with respect to external facing resources and workloads within the computing infrastructure. To this end, frequencies of network address usage by workloads for potential paths are determined as numbers of instances in which each path was followed such as, for example, numbers of times each path involving a computing resource was resolved to a particular workload. In various embodiments, only potential paths having frequencies above a threshold (e.g., having over a threshold number of instances of being followed) may be included in the mapping in order to only map potential paths which are statistically more significant.

The mapping results in a graph connecting computing resources and workloads. Once the graph has been created, the graph may be queried with respect to computing resources indicated in alerts in order to yield one or more potential paths from the queried computer resource through a workload in a computing environment. For example, a network address of an external facing resource identified in an alert may be used to generate the query. Root causes are determined based on entities among the potential paths (e.g., a component at the end of each potential path) returned in response to the query. In various embodiments, when a root cause has been identified, one or more mitigation actions may be performed to secure the computing infrastructure with respect to the root cause.

It has further been identified that the potential routes through which an IP address or other location identifier could be resolved to a workload in order to expose an internal resource which utilized the workload can be numerous, with many trivial paths effectively acting as noise which actively hinders root cause identification and threat mitigation. Correlating computing resources to workloads as described herein allows for unearthing more meaningful connections related to potential root causes which may be utilized to more efficiently identify and mitigate potential threats. Moreover, the disclosed embodiments include techniques for filtering potential paths using frequency which allow for further improving the efficiency of root cause identification.

FIG. 1 shows an example network diagram 100 utilized to describe the various disclosed embodiments. The example network diagram 100 illustrates a computing platform 110, a knowledge base 120, a path resolver 130, and a heatmap architect 140. The computing platform 110 may be realized via one or more networks such as, but not limited to, a wireless, cellular or wired network, a local area network (LAN), a wide area network (WAN), a metro area network (MAN), the Internet, the worldwide web (WWW), similar networks, and any combination thereof. The computing platform 110 may be or may include, but is not limited to, a cloud computing platform.

The computing platform 110 includes production servers 112 and one or more scanners 115. The production servers 112 may be configured to deploy and host web applications uploaded to the computing platform 110 by one or more software developer devices (not shown). The production servers 112 may be configured to utilize computing resources (not depicted) in order to perform tasks via one or more processes or groups of processes (not depicted). Such computing resources may be internal resources acting as logical components of the production servers 112 realized via portions of software.

Some or all of these computing resources may act as endpoints which may be exposed by external facing resources 150. Each external facing resource 150 is accessible to or otherwise expose internal resources (e.g., internal resources implemented via the production servers 112) to one or more resources which are deployed outside of the computing platform 110 such as, but not limited to, external resources 160. In other words, each external facing resource 150 may be accessible to one or more of the external resources 160 such that one or more internal resources implemented via the production servers 112 are exposed to those external resources 160 via the external facing resources 150.

The external facing resources 150 may be, but are not limited to, load balancers, content delivery networks (CDNs), network interfaces, gateways (e.g., Application Programming Interface [API] gateways), combinations thereof, and the like. In accordance with various disclosed embodiments, a network address or other identifier of such an external facing resource among the external facing resources 150 included in an alert may be utilized to identify, in a map, a path to a computing resource in the computing platform 110 via a workload when the computing resource is exposed via that external facing resource 150.

The scanners 115 are configured to scan the computing platform 110, binary artifacts, code, combinations thereof, and the like, and are configured to generate cybersecurity event data related to network activity, potential sources of cybersecurity events, intermediate representations of such potential sources, resulting artifacts of the software development process, combinations thereof, and the like. To this end, the scanners 115 may include, but are not limited to, scanners (e.g., cloud scanners), application security scanners, linting tools, combinations thereof, and any other security validation tools that may be configured to monitor network activities or potential sources of cybersecurity events.

Any scanners among the scanners 115 are configured to monitor for network activities and are configured to generate sources of cybersecurity event data. To this end, such scanners may be configured to monitor network activity and to generate logs of such network activity, or may be configured to monitor suspicious behavior and to generate alerts when such suspicious behavior is identified. The alerts may include information about the events, entities, or both, that triggered the alerts.

The cybersecurity event data included in the cybersecurity event data sources may be provided, for example, in the form of textual data. Such textual data may be analyzed using natural language processing and a semantic concepts dictionary in order to identify entity-identifying values representing specific entities in software development infrastructure which are related to the cybersecurity events, semantic concepts indicating types or other information about entities related to the cybersecurity events, both, and the like.

The knowledge base 120 stores data used for root cause identification and remediation in accordance with various disclosed embodiments. Such data includes, but is not limited to, a heat map (HM) 125. The heat map is a mapping of potential paths between external facing resources and other entities (e.g., internal resources implemented via the production servers 112) within a computing infrastructure. In an embodiment, the heat map has values based on frequencies determined for each path as described herein, i.e., frequencies defined with respect to a number of network addresses or other identifiers of computing resources resolved to a workload via each potential path. Such frequency mapping may be utilized to identify root causes of alerts, and may further aid in prioritizing alerts when performing mitigation actions.

Figure 5:
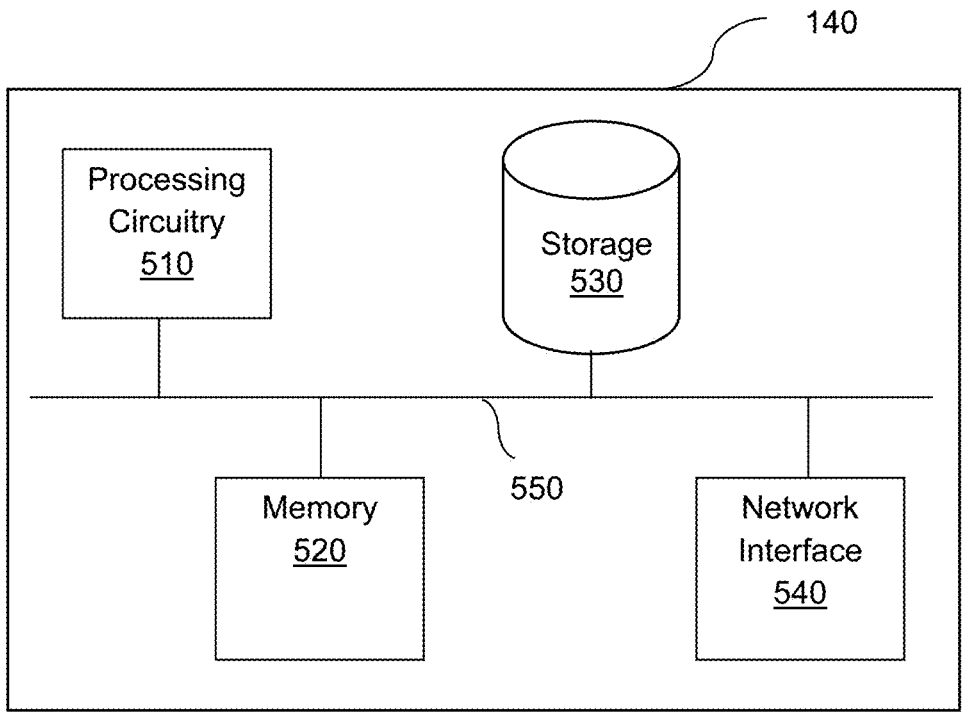
FIG. 5 is a schematic diagram of a heatmap architect according to an embodiment.

To this end, in an embodiment, the heatmap architect 140 is configured to populate the knowledge base 120 with data to be used by the path resolver 130 including, but not limited to, the heat map 125. The heatmap architect 140 may include, but is not limited to, a processing circuitry and a memory (e.g., as depicted in FIG. 5), where the memory contains instructions that configure the heatmap architect 140 to populate the knowledge base 120 as described herein when the instructions are executed by the processing circuitry. An example method for creating a knowledge base which may be performed by the heatmap architect 140 is described further below with respect to FIG. 3.

The path resolver 130, in turn, is configured to resolve paths for entities indicated in alerts in order to identify potential root causes of those alerts. To this end, the path resolver 130 may be configured to query the heat map 125 using an address of such an entity in order to obtain potential paths, and may further be configured to identify root causes based on those potential paths as described herein. An example process for resolving paths is described below with respect to FIG. 4.

It should be noted that the example network diagram depicted in FIG. 1 illustrates a particular arrangement of communicating components merely for simplicity purposes, but that the disclosed embodiments are equally applicable to different computing configurations. As a non-limiting example, any of the knowledge base 120, the path resolver 130, and the heatmap architect 140 may be deployed in the computing platform 110 without departing from the scope of the disclosure. Additionally, the monitored software may be deployed in an infrastructure other than a cloud computing infrastructure such as, but not limited to, an on-premises infrastructure.

Figure 2:
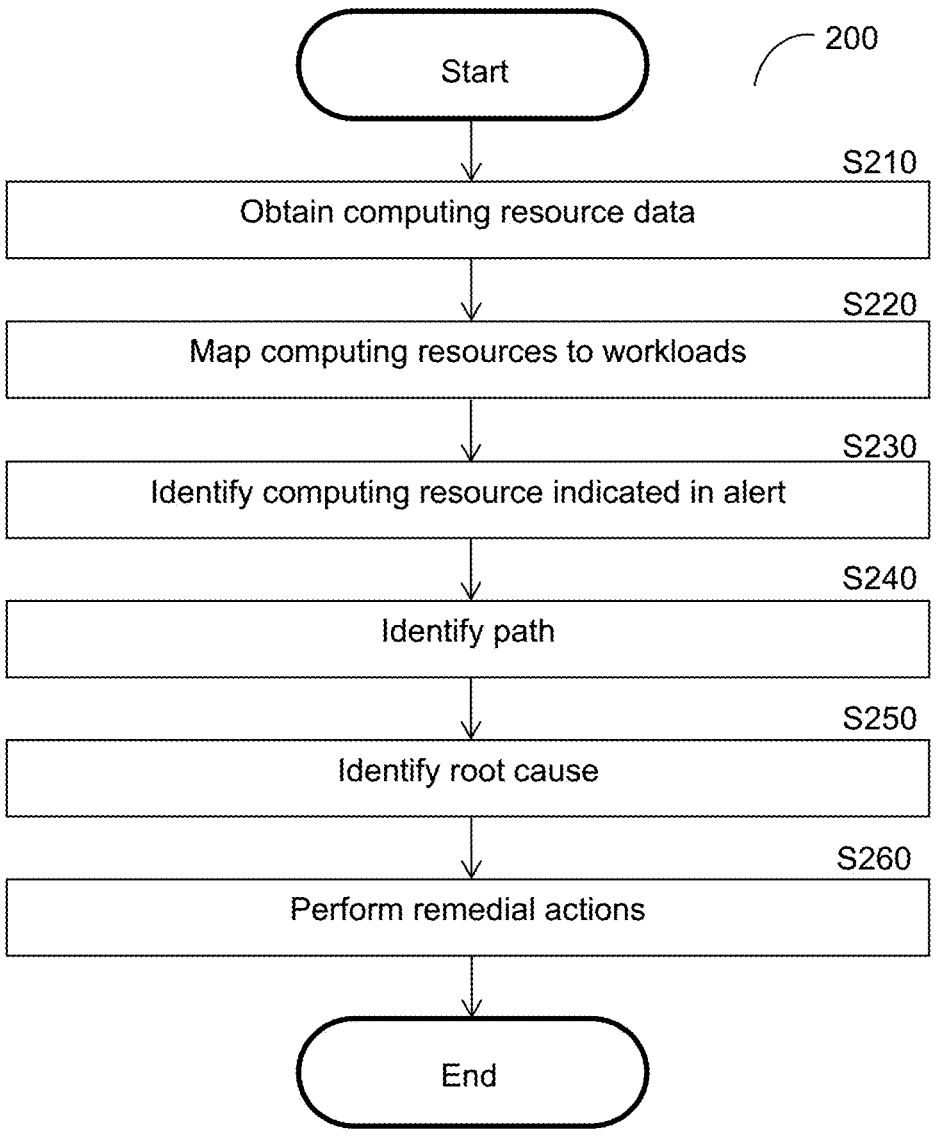
FIG. 2 is a flowchart illustrating a method for remediating cybersecurity threats using correlation-based network path resolution according to an embodiment.

FIG. 2 is a flowchart 200 illustrating a method for remediating cybersecurity threats using correlation-based network path resolution according to an embodiment. In an embodiment, the method is performed by the path resolver 130, FIG. 1.

At S210, computing resource data is obtained. The computing resource data indicates computing resources, where the computing resources indicated in the computing resource data include internal resources deployed in a computing environment (e.g., the computing platform 110, FIG. 1) and external facing resources (e.g., the external facing resources 150, FIG. 1) which are accessible to resources deployed outside of the computing environment (e.g., the external resources 160, FIG. 1) or otherwise expose internal resources of the computing environment (e.g., internal resources implemented via the production servers 112, FIG. 1) but which communicate (either directly or indirectly via, for example, workloads) with some or all of the internal resources, thereby potentially exposing the internal resources with which they communicate. The computing resource data may be or may include, but is not limited to, comma separated values (CSV) data.

In some implementations, the obtained data may be generated by scanners or other cybersecurity tools configured to identify and collect data related to computing resources deployed in and with respect to computing infrastructures. Alternatively or in combination, any or all of the obtained data may be obtained by querying a cloud provider or other operator of the computing infrastructure in which the internal resources are deployed in order to realize the computing environment. Moreover, the computing resource data may indicate relations between the computing resources (e.g., data related to communications between computing resources which indicate potential connections between the computing resources in data flows or otherwise with respect to activities performed in the computing environments).

The computing resources may be, but are not limited to, devices, programs, applications, virtual machines, software containers, or other computing resources which are utilized to perform activities with respect to the computing environments. The computing resources may be identified within the computing resource data with respect to identifiers such as, but not limited to, Internet Protocol (IP) addresses, Domain Name System (DNS) addresses, both, and the like.

The computing resource data may be utilized as a foundation upon which computing resources indicated in the computing resource data can be mapped to workloads as part of performing network address path resolution in accordance with the disclosed embodiments. More specifically, as described further below, a mapping may be created including connections between computing resources as well as connections from computing resources to workloads. Such a mapping including workloads allows for identifying potential root causes of cybersecurity alerts based on computing resources which called or otherwise triggered execution of the workloads.

At S220, computing resources indicated in the computing resource data are mapped to workloads. In an embodiment, S220 includes creating a graph having nodes and edges, where at least some of the nodes represent computing resources and at least some of the nodes represent workloads. The edges represent connections between nodes such as, but not limited to, communications between computing resources or calls between computing resources and workloads. In a further embodiment, the graph includes edges representing connections between workloads and computing resources, and more specifically, mapping external facing resources to workloads and then mapping those workloads to internal resources.

Each workload is a process or group of processes (e.g., a group of processes of a program, application, or other executable software) which may be executed within a computing environment, and is represented as a node in the graph. Computing resources may execute, utilize, or otherwise call such workloads in order to complete certain tasks, thereby triggering alerts. To this end, S220 includes mapping computing resources to workloads such that the mapping reflects potential connections between a workload which may be involved in an event that triggered an alert and a computing resource which may be affected by the alerted event.

As a non-limiting example, a workload may be a process of a software container computing resource, and that workload may be represented as a node corresponding to a container image of that software container which is connected by an edge to a node representing the software container. As another non-limiting example, a workload may be a process of a container instance group which runs a particular software container, and that workload may be represented as a node corresponding to the container instance group which is connected by an edge to a node representing the software container.

In an embodiment, the graph is a heatmap including data determined based on frequencies of different paths, where the frequency of a path is a number of instances of that path being followed such as, but not limited to, a number of network addresses or otherwise a number of computing resources resolved to a given workload of the path. To this end, each path in the heatmap may be represented as a series of nodes and edges, and the heatmap may include heat values representing the numbers of instances of the paths being followed. In a further embodiment, the heatmap is created as described below with respect to FIG. 3.

At S230, an entity indicated in an alert is identified. The entity may be, but is not limited to, an external facing resource such as, but not limited to, a load balancer, a content delivery networks (CDNs), a network interface, a gateway (e.g., Application Programming Interface [API] gateways), and the like. The entity may be indicated in the alert via one or more identifiers or network addresses such as, but not limited to, names, IP addresses, DNS addresses, combinations thereof, and the like.

At S240, a path from the entity indicated in the alert to an internal resource is identified based on the mapping. In an embodiment, S240 includes traversing the graph which at least maps computing resources to workloads in order to identify a path including a workload representing one or more computing resources being affected by a workload called or otherwise triggered by the entity indicated in the alert. In a further embodiment, the path is identified based on a relative amount of times that path was traversed, for example as represented by heat values of a heat map as described below with respect to FIG. 3. In yet a further embodiment, a path is identified only if it has above a threshold frequency, e.g., above a threshold heat value in a heat map.

Various non-limiting examples for paths which might be identified at S240 follow.

As a first non-limiting example, a network address is owned by a CDN, which exposes an endpoint that is served by a virtual machine (VM). A workload to which calls from the CDN are resolved at least a threshold number of times is mapped as part of a path from the CDN, and the path may further include the VM which utilizes the workload. Thus, such a path is indicative that the CDN exposes the VM and the VM may therefore be or relate to the root cause of alerts indicating the network address of the CDN.

As a second non-limiting example, a network address exposes an endpoint that serves a container instance group, where the container instance group runs a certain container. A workload corresponding to the container instance group to which the network address is resolved at least a threshold number of times is mapped as part of a path from the network address to the container. Thus, such a path is indicative that the network address exposes the container and the container may therefore be or relate to the root cause of alerts indicating the network address.

As a third non-limiting example, a network address is owned by a load balancer, which exposes an endpoint that is served by a VM. A workload to which calls from the load balancer are resolved at least a threshold number of times is mapped as part of a path from the load balancer to the VM. Thus, such a path is indicative that the load balancer exposes the VM and the VM may therefore be or relate to the root cause of alerts indicating the network address of the load balancer.

As a fourth non-limiting example, a network address is owned by a network interface which is contained in a software container cluster (e.g., a Kubernetes cluster or other cluster used for managing software containers), where the software container cluster includes a container. A workload of the software container cluster to which calls from the network interface are resolved at least a threshold number of times is mapped as part of a path from the network interface to the container. Thus, such a path is indicative that the network interface exposes the container and the container may therefore be or relate to the root cause of alerts indicating the network address of the network interface.

As a fifth non-limiting example, a network address is owned by an API gateway, which exposes an endpoint that is served by a VM, where the virtual machine runs a container. A workload to which calls from the API gateway are resolved at least a threshold number of times is mapped as part of a path from the API gateway, and the path may further include the VM which utilizes the workload and the container run by the VM. Thus, such a path is indicative that the API gateway exposes the VM and the container such that the VM, the container, or both, may therefore be or relate to the root cause of alerts indicating the network address of the API gateway.

At S250, a root cause of the alert is identified based on the identified path. The root cause may be determined, for example, based on internal resources exposed by workloads among the identified path, and may be such internal resources or may otherwise be determined based on the internal resources.

In an embodiment, the identified root cause is or includes one or more root cause entities that caused the alert. The root cause entities may be entities associated with event logic related to the cause of a cybersecurity event indicated in the cybersecurity event data such as, but not limited to, each software component of the software infrastructure that is connected to a policy which triggered an alert via the identified at least one path. The root cause entities may be collectively determined as the root cause of the cybersecurity event. As a non-limiting example, a root cause entity may be an entity containing faulty code (e.g., a file or container) which caused an alert to trigger. By identifying the entities which are the root cause of a cybersecurity event, more accurate and specific information about the cause of the cybersecurity event can be provided, and appropriate remedial actions involving those entities may be determined.

At S260, remedial action is taken with respect to the identified root cause. The remedial action may include, but is not limited to, generating and sending a notification, performing mitigation actions such as changing configurations of software components, changing code of software components, combinations thereof, and the like. As a non-limiting example, a configuration of a root cause entity that is a computing resource may be changed from "allow" to "deny" with respect to a particular capability of the computing resource, thereby mitigating the cause of the cybersecurity event. In some embodiments, S270 includes following a list of steps to fix underlying issues with the root cause entities.

Figure 3:
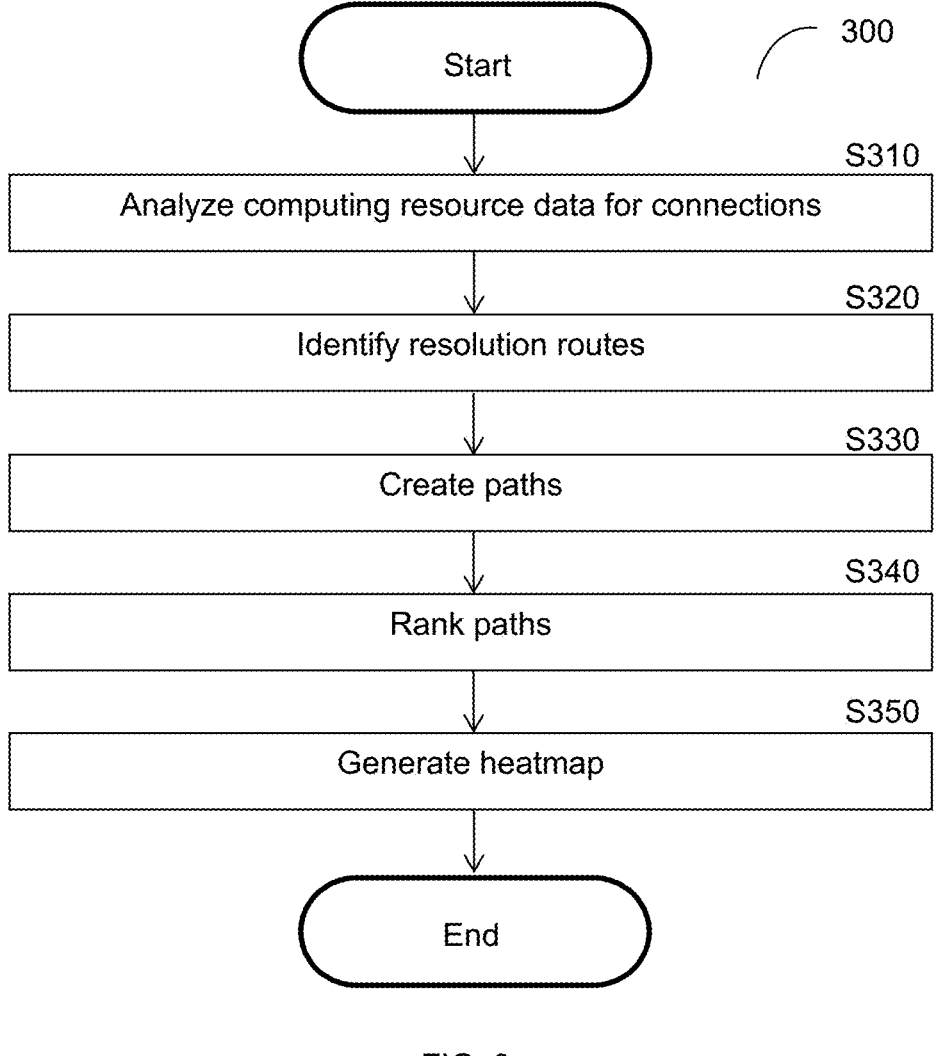
FIG. 3 is a flowchart illustrating a method for mapping network paths in a heatmap according to an embodiment.

FIG. 3 is a flowchart 300 illustrating a method for mapping network paths in a heatmap according to an embodiment. In an embodiment, the method is performed by the heatmap architect 140, FIG. 1.

At S310, computing resource data is analyzed in order to identify connections between entities. The connections may be identified, for example, based on communications between the entities such as, but not limited to, calls from one entity to another, messages sent between entities, commands sent from one entity to another, combinations thereof, and the like. In an embodiment, the entities include both computing resources and workloads such that at least some of the connections include connections between a computing resource and a workload.

At S320, resolution routes are identified based on the connections between entities. Each resolution route is a series of connections between entities beginning at a starting entity and concluding at an ending entity. In an embodiment, the beginning entity of each resolution route is a computing resource represented by a respective computing resource node and the ending entity of each resolution route is a workload represented by a respective workload node.

At S330, paths are created in the graph. Each path corresponds to one of the resolution routes and represents the resolution route using nodes and edges of the graph, i.e., such that nodes and edges along a given path represent the entities and connections between entities, respectively, of the corresponding resolution route.

In an embodiment, the paths include at least some paths which involve workloads, i.e., that demonstrate communications from one computing resource to another via workloads. Such paths include one or more nodes representing workloads, and at least some of those workload nodes are connected via edges to nodes representing computing resources. The paths effectively correlate computing resources to workloads in order to enable unearthing new potential connections between computing resources, and more particularly allow for unearthing meaningful information which might relate to root causes but cannot be discovered only by analyzing communications between computing resources directly.

At S340, the paths are ranked based on communications among the computing resource data.

In an embodiment, the paths are ranked based on the number of times each path was followed. To this end, in a further embodiment, S340 includes determining a number of instances in which a path including a computing resource resolved to a particular workload, where that number of instances is the number of times the path was followed. In other words, the number of times the path was followed is a number of instances of network addresses that were resolved to a workload through a particular path. As a non-limiting example, when a path from a CDN node to a workload node of a workload which is served by a virtual machine (VM) represented by a VM node, the number of instances in which a network address from the CDN node resolved to the workload node may be utilized as the number of times the path was followed. The paths may be ranked, e.g., from highest to lowest number of instances determined in this manner.

Ranking the paths based on use (i.e., the number of times each path was followed and therefore used) allows for determining which paths are more meaningful than others for purposes of establishing likely root causes of events. As noted above, it has been identified that workloads are relevant to establish such meaningful paths. Accordingly, the disclosed embodiments, which utilize paths determined by mapping workloads to computing resources, allows for unearthing these meaningful correlations which might relate to the root cause of any given alert. Moreover, these paths include internal portions within a computing environment, and the disclosed techniques may be utilized to identify these paths even when the alert only explicitly identifies external facing resources outside of the computing environment.

As noted above, filtering potential paths using frequency allows for more efficiently performing root cause identification. More specifically, ranking paths based on the number of times a path is followed allows for identifying the most frequently used paths, which in turn allows for effectively, automatically, and objectively identifying potentially relevant paths. As a non-limiting example, paths having a number of times of previous use above a predetermined threshold may be determined to have a meaningful frequency, which in turn allows for efficiently identifying paths which are more likely to lead back to root causes and only needing to analyze a subset of the potential paths which may lead through a given external facing resource. Consequently, the frequency-based ranking allows for optimizing the search for root causes.

At S350, a heatmap is generated based on the rankings of the paths. In an embodiment, the heatmap is a graph including nodes and edges as well as heat values representing frequencies of potential paths involving those nodes and edges. The heat values may be or may be determined based on the number of instances each path was followed as discussed above with respect to S340. As a non-limiting example, a heat value may be stored with the node for each workload, where the heat value stored for each such workload node corresponds to the ranking or otherwise corresponds to the number of instances of network addresses being resolved to the respective workload.

Once the heatmap has been created in this way, the heat map may be queried and traversed in order to identify paths based on identifiers of entities indicated in alerts, thereby allowing for computing resources which may relate to or otherwise be the root cause of the activity being alerted upon.

Figure 4:
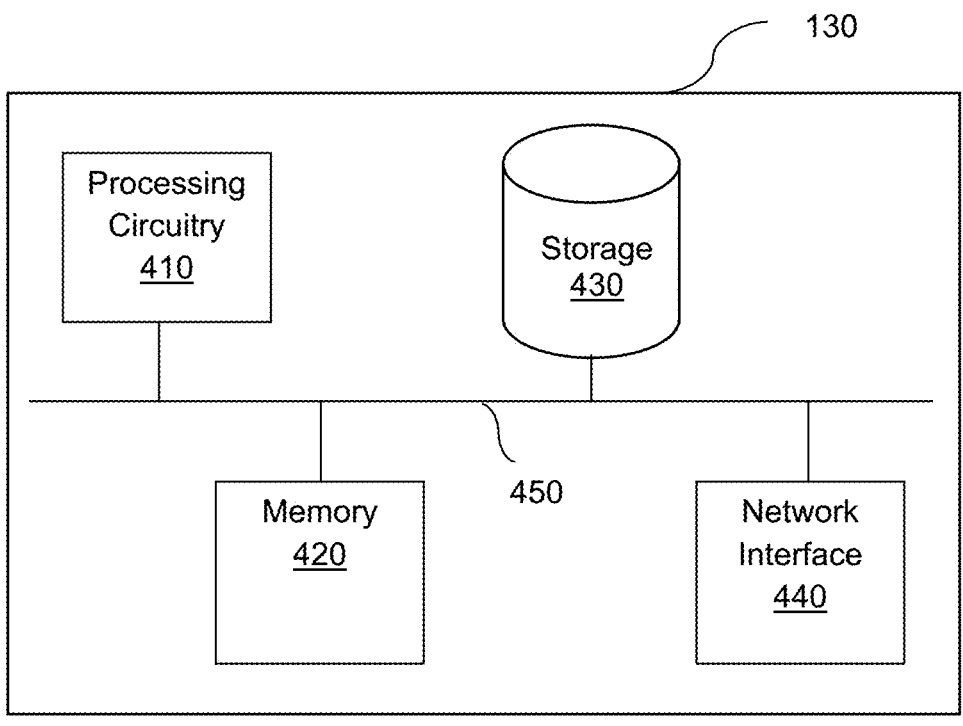
FIG. 4 is a schematic diagram of a path resolver according to an embodiment.

FIG. 4 is an example schematic diagram of a path resolver 130 according to an embodiment. The path resolver 130 includes a processing circuitry 410 coupled to a memory 420, a storage 430, and a network interface 440. In an embodiment, the components of the path resolver 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the path resolver 130 to communicate with, for example, the knowledge base 120, the scanner 115, and the like.

It should be understood that the embodiments described herein are not limited to the specific architecture illustrated in FIG. 4, and other architectures may be equally used without departing from the scope of the disclosed embodiments.

FIG. 5 is an example schematic diagram of a heatmap architect 140 according to an embodiment. The heatmap architect 140 includes a processing circuitry 510 coupled to a memory 520, a storage 530, and a network interface 540. In an embodiment, the components of the heatmap architect 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the heatmap architect 140 to communicate with, for example, the knowledge base 120, the production servers 112, and the like.

It should be understood that the embodiments described herein are not limited to the specific architecture illustrated in FIG. 5, and other architectures may be equally used without departing from the scope of the disclosed embodiments.

It should be noted that the methods of FIGS. 3 and 4 are discussed as being performed by different systems merely for simplicity purposes and without limiting the disclosed embodiments. In at least some embodiments, a single system may be configured to perform any or all of the steps of the methods of either FIG. 3 or FIG. 4. Such a system may be configured as described above with respect to FIG. 4 or FIG. 5, having stored thereon instructions for performing any or all of the steps between FIGS. 3 and 4.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for mitigating alerts using network path resolution, comprising:

generating a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of the plurality of computing resources and a plurality of workload nodes representing respective workloads of the plurality of workloads, wherein each workload is at least one process wherein the graph is a heatmap including a plurality of heat values, each heat value corresponding to a frequency of a respective path of a plurality of paths;

identifying a plurality of resolution routes, wherein each resolution route ends with a respective workload of the plurality of workloads;

identifying the plurality of paths based on the plurality of resolution routes, wherein each path includes a subset of the plurality of nodes and a subset of the plurality of edges, wherein the graph further indicates the identified plurality of paths;

identifying a path including at least one first workload of the plurality of workloads by querying the graph based on the plurality of heat values and a first computing resource of the plurality of computing resources indicated in an alert;

identifying at least one root cause of the alert based on the identified path; and performing at least one mitigation action based on the identified at least one root cause.

2. The method of claim 1, wherein identifying the path includes traversing the graph beginning with a node of the plurality of computing resource nodes corresponding to the first computing resource indicated in the alert.

3. The method of claim 1, further comprising:

ranking the plurality of paths based on the frequency of each path, wherein the plurality of heat values is determined based on the ranking.

4. The method of claim 1, wherein the frequency of each path is determined based on a number of instances in which the path resolved to a respective workload of the plurality of workloads.

5. The method of claim 1, wherein the identified path further includes a second computing resource of the plurality of computing resources, wherein the at least one root cause is identified based further on the second computing resource.

6. The method of claim 5, wherein the identified path is determined based on a resolution of the first computing resource to the first workload, wherein the second computing resource is connected to the first workload.

7. The method of claim 6, wherein the first computing resource is an external facing resource which is accessible to at least one external resource deployed outside of a computing environment, wherein the second computing resource is an internal resource deployed inside of the computing environment.

8. A non-transitory computer readable medium having stored thereon instructions for causing a processing circuitry to execute a process, the process comprising:

generating a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of the plurality of computing resources and a plurality of workload nodes representing respective workloads of the plurality of workloads, wherein each workload is at least one process wherein the graph is a heatmap including a plurality of heat values, each heat value corresponding to a frequency of a respective path of a plurality of paths;

identifying a plurality of resolution routes, wherein each resolution route ends with a respective workload of the plurality of workloads;

identifying the plurality of paths based on the plurality of resolution routes, wherein each path includes a subset of the plurality of nodes and a subset of the plurality of edges, wherein the graph further indicates the identified plurality of paths;

identifying a path including at least one first workload of the plurality of workloads by querying the graph based on the plurality of heat values and a first computing resource of the plurality of computing resources indicated in an alert;

identifying at least one root cause of the alert based on the identified path; and performing at least one mitigation action based on the identified at least one root cause.

9. A system for mitigating alerts using network path resolution, comprising:

a processing circuitry; and a memory, the memory containing instructions that, when executed by the processing circuitry, configure the system to:

generate a graph mapping at least between computing resources of a plurality of computing resources and workloads of a plurality of workloads, wherein the graph includes a plurality of nodes and a plurality of edges between nodes of the plurality of nodes, wherein the plurality of nodes includes a plurality of computing resource nodes representing respective computing resources of the plurality of computing resources and a plurality of workload nodes representing respective workloads of the plurality of workloads, wherein each workload is at least one process wherein the graph is a heatmap including a plurality of heat values, each heat value corresponding to a frequency of a respective path of a plurality of paths;

identify a plurality of resolution routes, wherein each resolution route ends with a respective workload of the plurality of workloads;

identify the plurality of paths based on the plurality of resolution routes, wherein each path includes a subset of the plurality of nodes and a subset of the plurality of edges, wherein the graph further indicates the identified plurality of paths;

identify a path including at least one first workload of the plurality of workloads by querying the graph based on the plurality of heat values and a first computing resource of the plurality of computing resources indicated in an alert;

identify at least one root cause of the alert based on the identified path; and perform at least one mitigation action based on the identified at least one root cause.

10. The system of claim 9, wherein identifying the path includes traversing the graph beginning with a node of the plurality of computing resource nodes corresponding to the first computing resource indicated in the alert.

11. The system of claim 9, wherein the system is further configured to:

rank the plurality of paths based on the frequency of each path, wherein the plurality of heat values is determined based on the ranking.

12. The system of claim 9, wherein the frequency of each path is determined based on a number of instances in which the path resolved to a respective workload of the plurality of workloads.

13. The system of claim 9, wherein the identified path further includes a second computing resource of the plurality of computing resources, wherein the at least one root cause is identified based further on the second computing resource.

14. The system of claim 13, wherein the identified path is determined based on a resolution of the first computing resource to the first workload, wherein the second computing resource is connected to the first workload.

15. The system of claim 14, wherein the first computing resource is an external facing resource which is accessible to at least one external resource deployed outside of a computing environment, wherein the second computing resource is an internal resource deployed inside of the computing environment.

* * * * *